Aug. 7, 1956 R. W. ILLSLEY 2,757,937
SUPPORTING LEG STRUCTURE FOR WHEELED TRUCK
Filed March 16, 1953
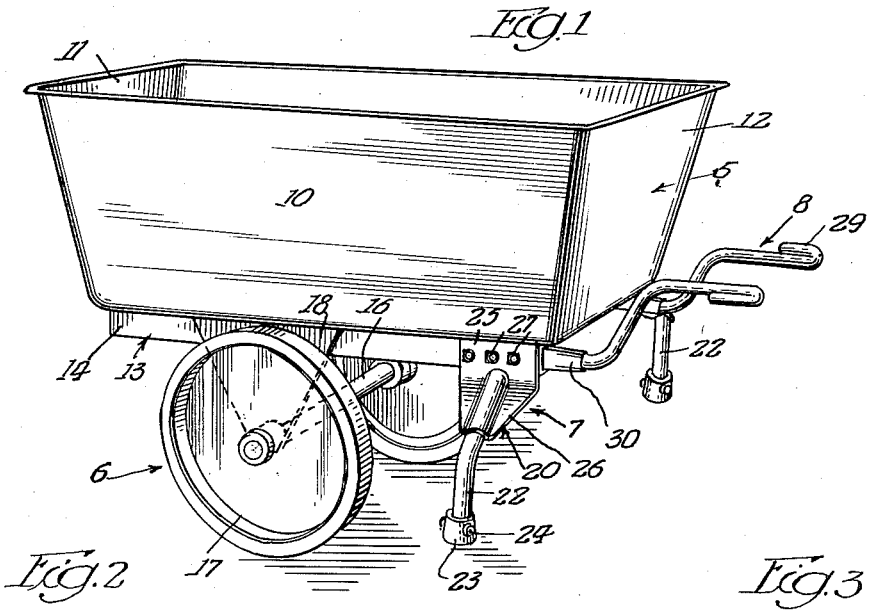
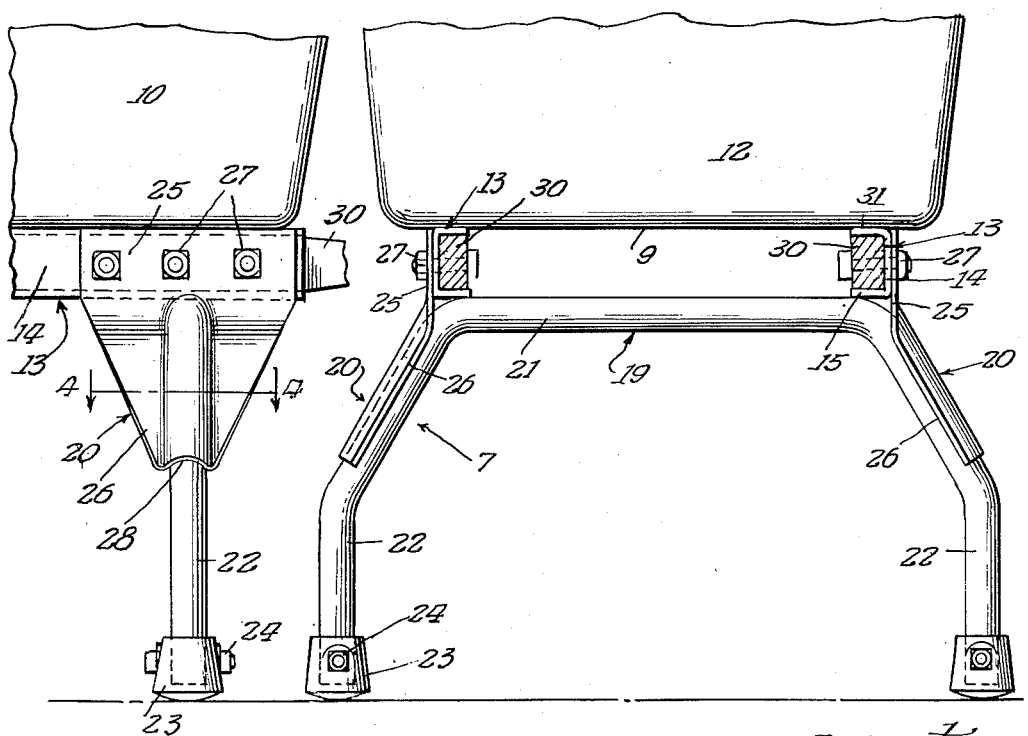
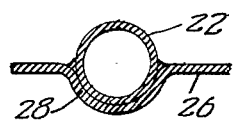
Inventor:
Ralph W. Illsley
By: Fred Gerlach
Atty

United States Patent Office 2,757,937
Patented Aug. 7, 1956

2,757,937

SUPPORTING LEG STRUCTURE FOR WHEELED TRUCK

Ralph W. Illsley, Chicago, Ill., assignor to The Allbright-Nell Company, Chicago, Ill., a corporation of Illinois Application March 16, 1953, Serial No. 342,427

1 Claim. (Cl. 280—47.33)

The present invention relates generally to trucks. More particularly the invention relates to that type of truck which is adapted to be propelled manually from place to place, serves as a medium or instrumentality for transporting material in bulk or other form and comprises a horizontally elongated open top body, a wheel assembly beneath the front portion of the body, a rigid leg structure beneath the rear portion of the body, and a handle arrangement which projects rearwards of the rear wall of the body and permits the user of the truck to push or pull the truck after first tilting upwards the rear end portion of the body in order to raise the leg structure from the subjacent ground or floor.

In a truck of the aforementioned type it has heretofore been proposed to employ as the rigid leg structure a pair of depending laterally spaced bar variety V-shaped legs, a substantially horizontal bar variety brace between the upper ends of the legs and an inverted V-shaped bar variety brace, the upper or apex portion of which is connected to the central portion of the substantially horizontal brace and the lower ends of which are connected to the lower ends of the legs. In practice it has been found that a truck having a leg structure of such character is subject to certain objections. In the first place the leg structure is difficult to assemble and costly to produce. Secondly, the leg structure, because it includes the inverted V-shaped brace between the legs, interferes with, and sometimes causes injury to, the legs and feet of the user of the truck.

The principal object of this invention is the provision of a truck having a rigid leg structure which eliminates the heretofore mentioned objections to a conventional or standard leg structure and is characterized by the fact that it is extremely simple in design and may be produced at a low cost while at the same time it is both efficient in operation and durable. In general the improved leg structure comprises an inverted U-shaped pipe, the intermediate member of which extends horizontally and is positioned beneath and transversely of the rear end portion of the bottom wall of the body and the side members of which form depending legs, and also comprises a pair of stamped plate metal gusset-like brackets which extend between the upper portions of the leg forming side members of the inverted U-shaped pipe and the superjacent portions of the truck and serve to secure the inverted U-shaped pipe in place.

Another object of the invention is to provide a truck leg structure of the character under consideration in which the lower parts of the gusset-like brackets have the central portions thereof bent or deflected outwards in order to form inwardly facing recesses and the upper ends of the leg forming side members of the inverted U-shaped pipe fit in, and are welded to, such recesses.

A further object of the invention is to provide a truck leg structure of the last mentioned character in which the upper parts of the gusset-like brackets are provided with simple and novel means for fixedly but removably securing the brackets in place with respect to the rear end portion of the truck body.

A still further object of the invention is to provide a truck having a leg structure which is generally of new and improved construction and effectively and efficiently serves its intended purpose.

Other objects of the invention and the various advantages and characteristics of the present truck will be apparent from a consideration of the following detailed description.

The invention consists in the several novel features which are hereinafter set forth and are more particularly defined by the claim at the conclusion hereof.

In the drawing which accompanies and forms a part of this specification or disclosure and in which like numerals of reference denote corresponding parts throughout the several views:

Figure 1 is a perspective of a truck having applied thereto a leg structure embodying the invention;

Figure 2 is a side view of the leg structure illustrating in detail the construction and arrangement of the gusset-like brackets for securing the inverted U-shaped pipe in place;

Figure 3 is a rear view of the leg structure; and

Figure 4 is an enlarged horizontal section taken on the line 4—4 of Figure 2 and illustrating in detail the manner in which the upper ends of the leg forming side members of the inverted U-shaped pipe fit within the inwardly facing recesses in the central portions of the lower parts of the brackets.

The truck which is shown in the drawing constitutes the preferred form or embodiment of the invention. It is adapted for use in transporting any material in bulk or other form and as its principal components comprises a horizontally elongated open top body 5, a wheel assembly 6 beneath the front portion of the body, a rigid leg structure 7 beneath the rear portion of the body and a handle arrangement 8 whereby the user may pull, push or otherwise manipulate the truck. Except for the particular leg structure and the manner of mounting the handle arrangement the truck is conventional.

The horizontally elongated open top body 5 is preferably of one piece design or construction and may be formed of galvanized steel or stainless steel, depending upon the use to which the truck is put. It is adapted to hold the material to be transported and consists of a flat rectangular bottom wall 9, a pair of opposed spaced apart side walls 10, a front wall 11 and a rear wall 12. The side walls extend upwards from the bottom wall and have the lower margins thereof joined to the side margins of the bottom wall. The front and rear walls 11 and 12 extend upwards and have the bottom margins thereof joined to the end margins of the bottom wall and their side margins joined to the side or end margins of the side walls. The upper margins of the side walls 10 and the front and rear walls 11 and 12 are flanged for reenforcing purposes. Depending from the bottom surface of the bottom wall 9 are two parallel channel beams 13. The latter extend lengthwise of the truck body and consist of vertically extending webs 14 and horizontally extending flanges 15 along the top and bottom margins of the webs. As best shown in Figure 3 of the drawing the channel beams are so arranged that the flanges thereof extend inwards, i. e., towards one another. The upper flanges of the channel beams abut against, and are preferably welded to, the side margins of the bottom wall 9 of the body 5.

The wheel assembly 6 enables the truck to be moved from place to place and comprises a horizontal axle 16 and a pair of wheels 17 on the ends of the axle. The axle is disposed beneath, and extends transversely of, the body 5 and has associated therewith a pair of triangular mounting brackets 18. The lower portions of the mounting brackets have holes through which the ends of the axle extend and the upper portions of the brackets fit against, and are welded or otherwise fixedly secured to, the front portions of the webs 14 of the channel beams 13. The wheels 17 are rotatably mounted on the ends of the axle.

The leg structure 7 is of unitary character and consists of an inverted U-shaped pipe 19 and a pair of gusset-like brackets 20. The inverted U-shaped pipe 19 is formed of steel and has such wall thickness that it is rigid. It is located directly beneath the rear ends of the channel beams 13 and consists of a horizontal intermediate member 21 and a pair of depending side members 22. The intermediate member 21 extends transversely of the truck body 5 and is straight. The side members 22 of the inverted U-shaped pipe 19 constitute legs for supporting the rear portion of the body in an elevated position when the truck is at rest. The upper ends of the side members are upwardly and inwardly inclined at an angle of approximately 30° with respect to the vertical and have the upper extremities thereof joined to, and formed integrally with, the ends of the horizontally extending intermediate member 21. The lower ends of the side members 22 extend vertically and have feet 23 on their lower extremities. The feet are cup-shaped and surround the lower extremities of the vertically extending lower ends of the side members 22. They are formed of steel castings and are secured in place by way of horizontal bolts 24. The latter extend through aligned holes in the side walls of the feet 23 and the lower extremities of the lower ends of the side members 22. The gusset-like brackets 20 of the leg structure 19 are formed of stamped plate metal in order that they are rigid. They are located adjacent the rear ends of the channel beams 13 and consist of vertically extending horizontally elongated upper parts 25 and downwardly tapered or substantially triangular lower parts 26. The upper parts extend vertically, as shown in the drawing. They fit flatly against the outer surfaces of the rear ends of the webs 14 of the channel beams and are fixedly but removably secured in place by horizontal bolts 27. The latter extend through aligned holes in the upper parts 25 of the gusset-like brackets 20 and the rear ends of the vertically extending webs 14 of the channel beams 13. The lower parts 26 of the brackets 20 extend downwards and outwards so that they assume an angle with respect to the vertical corresponding to that of the upwardly and inwardly inclined upper ends of the leg forming side members 22 of the inverted U-shaped pipe 10. The central portions of the lower parts 26 of the brackets 20 are bent or deflected outwards in order to form inwardly facing recesses 28. The latter are substantially semi-circular in cross section and have the upwardly and inwardly inclined upper ends of the leg forming side members 22 disposed therein.

Such upper ends of the side members are welded to the recess defining central portions of the lower parts of the brackets 20 in order that the inverted U-shaped pipe 19 is connected fixedly to the brackets 20. The upper ends of the side members 22, as the result of being disposed in the recesses 28, are so laterally interlocked with the brackets 20 that the inverted U-shaped pipe 19 is positively locked or held against fore and aft displacement with respect to the gusset-like brackets. As a result of the fact that the leg structure 7 embodies the inverted U-shaped pipe 19 the leg structure has no internal bracing or obstruction which interferes with, or is likely to cause injury to, the legs and feet of the user of the truck. The horizontally extending intermediate member 21 of the inverted U-shaped pipe 19 serves not only to hold the leg forming side members 22 in fixed laterally spaced relation but also to reenforce the rear portion of the truck body 5.

The handle arrangement 8 of the truck projects rearwards of the rear wall 12 of the body 5 and permits the user to push or pull the truck after first tilting upwards the rear end portion of the body in order to raise the leg structure 7 from the subjacent ground or floor. It consists of a pair of laterally spaced rods, the rear ends of which are bent outwards and then forwards to form hand grips 29, and the front ends of which are provided with fixed forwardly extending block-like extensions 30. The extensions fit within the rear ends of the channel beams 13 and have holes 31 through which the horizontal bolts 27 extend. The bolts have a twofold purpose in that they serve not only to secure in place the gusset-like brackets 20 but also to anchor or connect the extensions 30 to the rear ends of the channel beams. When it is desired to remove the leg structure 7 and the handle arrangement 8 it is only necessary to withdraw the bolts 27 from their normal position.

The herein described truck, due to the particular design and construction of the leg structure 7 and the manner of mounting the handle arrangement 8, is capable of being produced at a comparatively low cost and also assembled with facility. The leg structure, because it consists of only the inverted U-shaped pipe 19 and the gusset-like plates 20, is essentially simple in design and effectively and efficiently fulfills its intended purpose.

The invention is not to be understood as restricted to the details set forth since these may be modified within the scope of the appended claim without departing from the spirit and scope of the invention.

Having thus described the invention what I claim as new and desire to secure by Letters Patent is:

As parts of a truck of the type that embodies an elongated open top body, a pair of spaced apart parallel channel beams disposed beneath and connected to the bottom wall of the body, extending lengthwise of said body and arranged so that the webs thereof extend vertically and their side flanges extend horizontally and inwards, and a wheel assembly disposed beneath, and connected to, the front portions of the beams; a leg structure adapted to support the rear portion of the body when the truck is at rest and comprising a pair of upstanding spaced apart gusset-like brackets formed of stamped plate metal and having the upper parts thereof flat and fitting flatly against the outer surfaces of the rear ends of the webs of the channel beams and their lower parts extending downwards and outwards and deflected centrally and outwards to form inwardly forming recesses of substantially semi-circular cross section, and an inverted U-shaped pipe of circular cross section extending between the brackets and consisting of a horizontal intermediate member having the ends thereof disposed directly beneath the rear ends of the lower side flanges of the beams, and a pair of leg-forming side members joined to, and depending from, the ends of the intermediate member and having the lower ends thereof extending vertically and their upper ends inclined upwards and inwards, seated in, and welded to, said recesses, and so interlocked with said recesses that the pipe as a whole is positively held against for and aft displacement with respect to the brackets, a handle arrangement projecting rearwards from the rear wall of the truck body and provided at the front portion thereof with a pair of block-like extensions that fit snugly within the rear ends of the channel beams, and horizontal bolts extending through, and serving to connect together, the upper parts of the brackets, the rear ends of the webs of the channel beams and the block-like extensions of the handle arrangement.

References Cited in the file of this patent

UNITED STATES PATENTS

| | | |
|---|---|---|
| 258,323 | Shumaker | May 23, 1882 |
| 1,033,421 | Kochler | July 23, 1912 |

(Other references on following page)

UNITED STATES PATENTS

| | | |
|---|---|---|
| 1,176,375 | Leach | Mar. 21, 1916 |
| 1,180,009 | Chein | Apr. 18, 1916 |
| 1,215,633 | Dorsey | Feb. 13, 1917 |
| 1,578,213 | Smith | Mar. 23, 1926 |
| 1,815,244 | Dodge | July 21, 1931 |
| 1,821,636 | Harter | Sept. 1, 1931 |
| 1,908,618 | Watson | May 9, 1933 |
| 2,274,077 | Marzolf | Feb. 24, 1942 |
| 2,428,877 | Holabird | Oct. 14, 1947 |
| 2,662,778 | Ristow | Dec. 15, 1953 |

FOREIGN PATENTS

| | | |
|---|---|---|
| 719,619 | France | Nov. 23, 1931 |
| 819,504 | Germany | Oct. 31, 1951 |
| 290,528 | Italy | Nov. 21, 1931 |
| 78,724 | Norway | June 25, 1951 |